United States Patent
Bacon et al.

(10) Patent No.: US 9,846,785 B2
(45) Date of Patent: Dec. 19, 2017

(54) EFFICIENT TWO PARTY OBLIVIOUS TRANSFER USING A LEVELED FULLY HOMOMORPHIC ENCRYPTION

(71) Applicant: International Business Machines Corporation, Armonk, NY (US)

(72) Inventors: David F. Bacon, Sleepy Hollow, NY (US); Graham A. Bent, Hursley (GB); Flavio A. Bergamaschi, Southampton (GB); Wei Zhang, Egham (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 41 days.

(21) Appl. No.: 14/952,717

(22) Filed: Nov. 25, 2015

(65) Prior Publication Data

US 2017/0147835 A1    May 25, 2017

(51) Int. Cl.
*H04L 9/00* (2006.01)
*G06F 21/62* (2013.01)
(Continued)

(52) U.S. Cl.
CPC .......... *G06F 21/6227* (2013.01); *H04L 9/008* (2013.01); *H04L 9/14* (2013.01);
(Continued)

(58) Field of Classification Search
CPC ... H04L 9/14; H04L 9/34; H04L 9/008; H04L 9/3093; H04L 2209/50; H04L 2209/24; G06F 21/6277
See application file for complete search history.

(56) References Cited

U.S. PATENT DOCUMENTS 7,987,201 B2   7/2011   Ramzan
8,630,422 B2   1/2014   Gentry
(Continued)

FOREIGN PATENT DOCUMENTS

WO   2014137392 A1   7/2014
WO   2014137394 A1   9/2014

OTHER PUBLICATIONS

Javier Herranz, "Restricted Adaptive Oblivious Transfer," International Association for Cryptologic Research, https://eprint.iacr.org/2008/182.pdf, Jul. 27, 2011.
(Continued)

*Primary Examiner* — Beemnet Dada
(74) *Attorney, Agent, or Firm* — Nicholas D. Bowman; Matthew M. Hulihan; Heslin Rothenberg Farley & Mesiti PC

(57) ABSTRACT

A querying node generates public keys, secret keys, and switch key matrices. A public key associated with a first level and the switch key matrices are sent to a receiving node. The receiving node generates a key-value table, mapping values to keys, and encodes the keys and values using a polynomial ring of a predetermined type. The querying node encodes using a polynomial ring of the same predetermined type, then encrypts a query, using a public key, and sends the query to the receiving node. The receiving node performs a homomorphic comparison of the encrypted, encoded query with each encoded key entry in the encoded key-value store to determine a comparison result. The receiving node sums the results for each of the value entries and returns the summed result to the querying node. The querying node decrypts and decodes the received result using the corresponding secret key.

15 Claims, 9 Drawing Sheets

(51) Int. Cl.
*H04L 9/32* (2006.01)
*H04L 9/14* (2006.01)
*H04L 9/30* (2006.01)

(52) U.S. Cl.
CPC ............ *H04L 9/3093* (2013.01); *H04L 9/321* (2013.01); *H04L 2209/24* (2013.01); *H04L 2209/50* (2013.01)

(56) References Cited

U.S. PATENT DOCUMENTS

| | | | |
|---|---|---|---|
| 8,904,171 B2 | 12/2014 | Clifton et al. | |
| 9,031,229 B1* | 5/2015 | Nita | H04L 9/008 380/28 |
| 9,281,941 B2* | 3/2016 | Gentry | H04L 9/008 |
| 2009/0083546 A1* | 3/2009 | Staddon | G06F 21/6227 713/189 |
| 2011/0110525 A1 | 5/2011 | Gentry | |
| 2011/0283099 A1* | 11/2011 | Nath | H04L 9/008 713/150 |
| 2012/0039473 A1 | 2/2012 | Gentry et al. | |
| 2012/0066510 A1 | 3/2012 | Weinman | |
| 2013/0329883 A1 | 12/2013 | Tamayo-Rios | |
| 2014/0059345 A1 | 2/2014 | Camenisch | |
| 2015/0039912 A1* | 2/2015 | Payton | H04L 9/14 713/193 |
| 2015/0244517 A1 | 8/2015 | Nita | |
| 2015/0295716 A1 | 10/2015 | Liu | |
| 2016/0105402 A1* | 4/2016 | Soon-Shiong | H04L 63/0428 713/164 |

OTHER PUBLICATIONS

Xum Yi, et al., "Single-Database Private Information Retrieval From Fully Homomorphic Encryption," IEEE Transactions on Knowledge and Data Engineering, vol. 25, No. 5, May 2013.

Haibo Hu, et al., "Private search on key-value stores with hierarchical indexes", IEEE 30th International Conference on Data Engineering, pp. 628-639, 2014.

Yehuda Lindell, et al., "Secure Two-Party Computation Via Cut-and-Choose Oblivious Transfer," International Association for Cryptologic Research, http://eprint.iacr.org/2010/284.pdf, Mar. 16, 2015.

Mani, Murali, "Enabling Secure Query Processing in the Cloud using Fully Homomorphic Encryption", Proceeding DanaC '13 Proceedings of the Second Workshop on Data Analytics in the Cloud, Jun. 23, 2013, pp. 36-40.

Gahi, Youssef, et al., "A Secure Database System using Homomorphic Encryption Schemes", DBKDA 2011: The Third International Conference on Advances in Databases, Knowledge, and Data Applications, 2011, pp. 54-58.

Palamakumbura, Sudharaka, et al., "Database Query Privacy using Homomorphic Encryptions", Information Theory (CWIT), 2015 IEEE 14th Canadian Workshop on Information Theory, Jul. 6-9, 2015, pp. 71-74.

Brakerski, Zvika, et al., "(Leveled) fully homomorphic encryption without bootstrapping." ITCS '12: Proceedings of the 3rd Conference on Innovations in Theoretical Computer Science, 2012, pp. 309-325.

Bacon et al., "Performing Efficient Comparison Operations on Encrypted Data", U.S. Appl. No. 14/952,210, filed Nov. 25, 2015.

Bacon et al., "Comparison and Search Operations of Encrypted Data", U.S. Appl. No. 14/834,485, filed Aug. 25, 2015.

List of IBM Patents or Applications Treated as Related, Oct. 28, 2016, pp. 1-2.

"Performing Secure Queries From a Higher Security Domain of Information in a Lower Security Domain", U.S. Appl. No. 15/254,811, filed Sep. 1, 2016, pp. 1-23.

* cited by examiner

| 802 | | | |
|---|---|---|---|
| KEY (NAME) [804] | VALUE 1 (ADDRESS) [806] | VALUE 2 (ACCOUNT) [808] | VALUE 3 (BALANCE) [810] |
| e(ALI) | e(ADDRESS A) | e(ACCOUNT A) | e(BALANCE A) |
| e(BOB) | e(ADDRESS B) | e(ACCOUNT B) | e(BALANCE B) |
| e(CAT) | e(ADDRESS C) | e(ACCOUNT C) | e(BALANCE C) |
| e(DAN) | e(ADDRESS D) | e(ACCOUNT D) | e(BALANCE D) |

FIG. 8

| QUERY [1002] | KEY (NAME) [804] | COMPARISON [1004] | VALUE 1 (ADDRESS) [806] | RESULT [1006] |
|---|---|---|---|---|
| ε(e(BOB)) | (e(ALI)) | ε(0) | e(RECORD A) | ε(0) |
| ε(e(BOB)) | (e(BOB)) | ε(1) | e(RECORD B) | ε(e(RECORD B)) |
| ε(e(BOB)) | (e(CAT)) | ε(0) | e(RECORD C) | ε(0) |
| ε(e(BOB)) | (e(DAN)) | ε(0) | e(RECORD D) | ε(0) |
| | | | | |
| | | | ANSWER: | ε(e(RECORD B)) |

FIG. 10

EFFICIENT TWO PARTY OBLIVIOUS TRANSFER USING A LEVELED FULLY HOMOMORPHIC ENCRYPTION

STATEMENT REGARDING FEDERALLY SPONSORED RESEARCH OR DEVELOPMENT

This invention was made with United States Government support under contract number W911NF-06-3-0001 awarded by the United States Army. The United States government has certain rights to this invention.

This invention was made with United Kingdom Government support under contract number W911NF-06-3-0001 awarded by the Ministry of Defense.

BACKGROUND

The present invention relates to the oblivious transfer of information between two parties, and more specifically to two party oblivious transfer of information using a leveled fully homomorphic encryption (FHE).

Homomorphic encryption is a form of encryption that allows operations to be carried out on ciphertexts, generating an encrypted result which, when decrypted, matches the result of the same operations performed on the plaintexts corresponding to each of the ciphertexts.

Consider a scenario where an organization P, such as a police force, requires some information from another organization B, such as a bank, about a specific entity C, such as a customer, but does not want B to learn which entity C that P is interested in. It would be desirable for P to be able to construct a query such that whilst B cannot learn which entity's C information is being requested, B can still process the query, obtain the correct answer, and return a result for the query without learning what information was returned. Such a scenario is known as oblivious transfer.

Schemes that implement oblivious transfer exist in a multi-party setting. P produces public keys $P_k$ that are used to encrypt the query which is sent as ciphertext to B. B uses the same public keys $P_k$ to encrypt its data which is then compared with the encrypted query, using homomorphic addition and multiplication operations, to produce the required encrypted result. The encrypted result is sent back to P as ciphertext. P can then decrypt the ciphertext using a corresponding secret key $S_k$ to obtain the result in plaintext.

Zvika Brakerski, Craig Gentry, and Vinod Vaikuntanathan, 2012, "Fully homomorphic encryption without bootstrapping", in Proceedings of the 3rd Innovations in Theoretical Computer Science Conference (ITCS '12), ACM, New York, N.Y., USA, 309-325 discloses an FHE scheme based on the ring learning with error (RWLE) scheme that have $2^\lambda$ security against known attacks. This scheme will be referred to herein as the BGV scheme.

SUMMARY

According to an embodiment of the invention, a computer-implemented method for effecting an oblivious query from a querying node to a receiving node based on a leveled fully homomorphic encryption scheme, the computer-implemented method comprising: a querying node generating a plurality of public keys, a corresponding plurality of secret keys and a plurality of switch key matrices, each public key being associated with a level of the fully homomorphic encryption scheme, the switch key matrices being used to switch ciphertexts from a higher level of the fully homomorphic encryption scheme to a next lower level of the fully homomorphic encryption scheme; the querying node sending at least a public key associated with said first higher of the fully homomorphic encryption scheme and said plurality of switch key matrices to a receiving node; the receiving node generating a key value table, the key value table mapping values to keys and encoding the keys and values of the key value table into an encoded key-value store using an element of an integer polynomial ring having coefficients in a predetermined range and of a predetermined degree; the querying node generating a query representative of a data request, encoding the query using an element of an integer polynomial ring having coefficients in the said predetermined range and of the said predetermined degree, encrypting the encoded query using one of the generated public keys, and sending the encrypted, encoded query to the receiving node; the receiving node performing a homomorphic comparison of the encrypted, encoded query with each of the encoded key entries in the encoded key-value store to determine, for each key entry, a comparison result; the receiving node summing the encrypted, encoded values for each of the value entries and returning the summed encrypted, encoded result to the querying node; and the querying node decrypting the received encrypted, encoded result using the corresponding secret key and decoding the encoded value to produce a query result.

Embodiments of the invention provide a system for effecting an oblivious query from a querying node to a receiving node based on a leveled fully homomorphic encryption scheme, the system comprising: a key manager, associated with the querying node, which generates a plurality of public keys, a corresponding plurality of secret keys and a plurality of switch key matrices, each public key being associated with a level of the fully homomorphic encryption scheme, the switch key matrices being used to switch ciphertexts from a first level of the fully homomorphic encryption scheme to a next lower level of the fully homomorphic encryption scheme, the key manager sending at least a public key associated with said first level of the fully homomorphic encryption scheme and said plurality of switch key matrices to the receiving node; a key value table generator, associated with a receiving node, which generates a key value table, the key value table mapping values to keys and encoding the keys and values of the key value table into an encoded key-value store using an element of an integer polynomial ring having coefficients in a predetermined range and of a predetermined degree; a query generator, associated with the querying node, which generates a query representative of a data request, encodes the query using an element of an integer polynomial ring having coefficients in the said predetermined range and of the said predetermined degree, encrypts the encoded query using one of the generated public keys, and sends the encrypted, encoded query to the receiving node; a result generator, associated with the receiving node, which performs a homomorphic comparison of the encrypted, encoded query with each of the encoded key entries in the encoded key-value store to determine, for each key entry, a comparison result and which sums the encrypted, encoded values for each of the value entries and returns the summed encrypted, encoded result to the querying node; and a result receiver, associated with the querying node, which decrypts the received encrypted, encoded result using the corresponding secret key and decodes the encoded value to produce a query result.

Embodiments of the invention also provide a computer program product for effecting an oblivious query from a querying node to a receiving node based on a leveled fully homomorphic encryption scheme, the computer program product comprising: a computer readable storage medium having program instructions embodied therewith, the program instructions executable by a computer to cause the computer to: generate, at a querying node, a plurality of public keys, a corresponding plurality of secret keys and a plurality of switch matrices, each public key being associated with a level of the fully homomorphic encryption scheme, the switch key matrices being used to switch ciphertexts from a first level of the fully homomorphic encryption scheme to a next lower level of the fully homomorphic encryption scheme; send, from the querying node, at least a public key associated with said first level of the fully homomorphic encryption scheme and said plurality of switch key matrices to a receiving node; generate, at the receiving node, a key value table, the key value table mapping values to keys and encoding the keys and values of the key value table into an encoded key-value store using an element of an integer polynomial ring having coefficients in a predetermined range and of a predetermined degree; generate, at the querying node, a query representative of a data request, encoding the query using an element of an integer polynomial ring having coefficients in the said predetermined range and of the said predetermined degree, encrypting the encoded query using one of the generated public keys, and sending the encrypted, encoded query to the receiving node; perform, at the receiving node, a homomorphic comparison of the encrypted, encoded query with each of the encoded key entries in the encoded key-value store to determine, for each key entry, a comparison result; sum, at the receiving node, the encrypted, encoded values for each of the value entries and returning the summed encrypted, encoded result to the querying node; and decrypt, at the querying node, the received encrypted, encoded result using the corresponding secret key and decoding the encoded value to produce a query result.

BRIEF DESCRIPTION OF THE DRAWINGS

Preferred embodiments of the present invention will now be described in more detail, by way of example only, with reference to the accompanying drawings, in which:

FIG. 8 is an example encoded key value table generated in FIG. 7;

FIG. 10 shows the encoded key value of FIG. 8 together with the received query of FIG. 6 and the encrypted result of the query;

DETAILED DESCRIPTION

Schemes that use FHE operations are complex, especially ones that use homomorphic multiplication, which results in very inefficient and costly computation. Also, for the schemes described above, there may be many organizations like P, such as other police forces, that wish to query the same organization B. Each organization P has a different public key $P_k$ requiring B to encrypt its data with each of the different public keys $P_k$. Since the ciphertext representation of the plaintext data is much larger, typically 10,000 times larger, a basic implementation therefore requires large amounts of storage of large ciphertexts.

Figure 1:
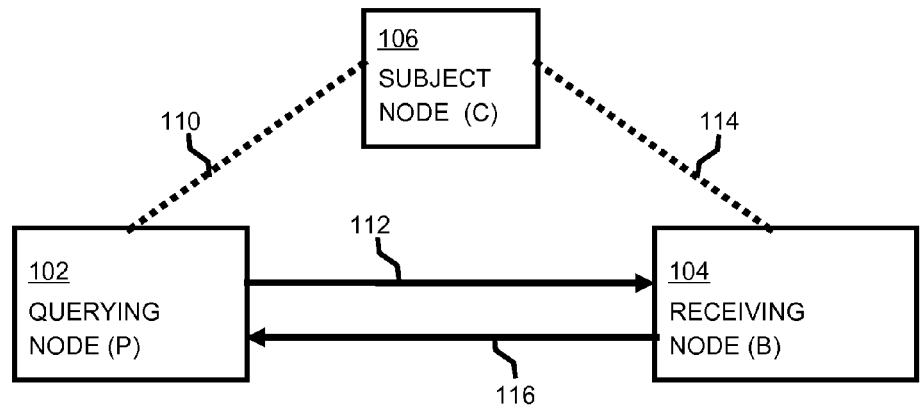
FIG. 1 is a block diagram of an environment in which embodiments of the present invention of two party oblivious transfer may be implemented.

FIG. 1 is a block diagram of an environment in which embodiments of the present invention of two party oblivious transfer may be implemented. Querying node 102 wishes to obtain some information from receiving node 104, but does not want receiving node 104 to learn which subject node 106 that querying node is interested in. In an exemplary embodiment, querying node 102 is a police or law enforcement organization, receiving node 104 is a bank or financial institution and subject node 106 is a customer of the receiving node 104 about whom querying node 102 wishes to obtain information. Querying node 102 has an interest 110 in subject node 106 and desires information about subject node 106 which is held by receiving node 104. Querying node 102 sends a query 112 to receiving node 104 requesting information about subject node 106 who has a relationship 114 with receiving node 104. Receiving node 104 returns 116 the requested information that it hold about subject node 106.

What is desired is that receiving node 104 cannot determine from query 112 which of a plurality of subject nodes 106, each having a relationship 114 with receiving node 104, the querying node 102 is interested. Further, it is desired that receiving node 104 also cannot determine this information from the returned 116 requested information.

The information held by receiving node 104 about subject node 106 may be contained in "private" databases, such as bank details. In another embodiment, the information held by receiving node 104 about subject node 106 may be contained in a "public" database. A "public" database may not necessarily be available to the general public, but could, for example, be available to all employees of the receiving node 104, such as a government agency, employer or organization. Queries made to the government agency, employer or organization will typically be logged in some way. A query from a querying node 102, such as a police force, will indicate to the receiving node 104 the identity of the subject node 106 that the querying node is interested in. Conventionally, the querying node 102 has to rely on non-disclosure agreements, rather than a technical solution, to maintain secrecy of its inquiries.

Figure 2:
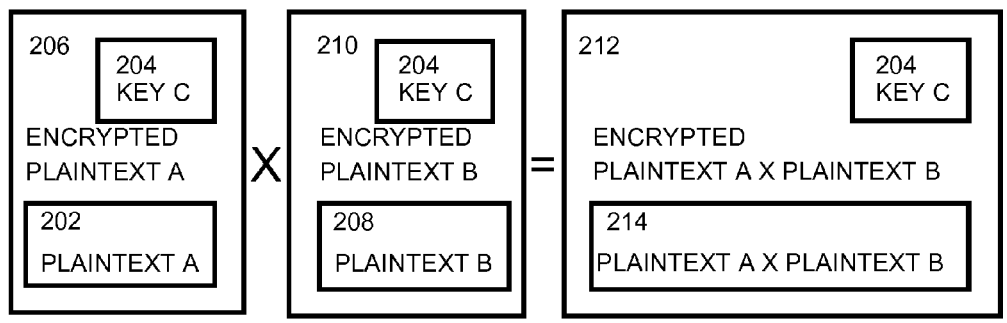
FIG. 2 shows an example of a known homomorphic multiplication between two ciphertexts.

Referring to FIG. 2, which shows known homomorphic multiplication between two ciphertexts. Plaintext A 202 is encrypted using public key C 204 to produce an encrypted plaintext A 206. Plaintext B 208 is also encrypted using public key C 204 to produce an encrypted plaintext B 210. Using known homomorphic multiplication between the two ciphertexts of encrypted plaintext A 206 and encrypted plaintext B 210, the result of the homomorphic multiplication is encrypted (plaintext A×plaintext B) 212, encrypted with public key C 204. This result may be decrypted using a secret key corresponding to the public key C 204. The homomorphic multiplication requires the computation of the tensor product between encrypted ciphertext A 206 and encrypted ciphertext B 210 followed by a further expensive refresh operation that maps the resulting ciphertext into a new ciphertext that is decryptable under the original secret key C 204 or a secret key at a different level of the BGV scheme, but corresponding to secret key C 204. Details of this refresh operation can be found in the BGV scheme prior art cited above.

One surprising result of the BGV scheme is that if a plaintext message is suitably encoded then it is possible to perform a simple polynomial multiplication operation between a ciphertext message and the plaintext message. The resulting ciphertext is an encryption of the product of the two messages. The encoding of the plaintext required to make this possible is a mapping of the message into the same polynomial ring structure used to construct the ciphertext. Technically this polynomial ring is an integer polynomial ring reduced by a chosen cyclotomic polynomial. This operation is significantly faster (~1000×) than performing the same homomorphic multiplication between two ciphertexts. The latter requires the computation of the tensor product between the ciphertexts followed by a further expensive refresh operation that maps the resulting ciphertext into a new ciphertext that is decryptable under the original secret key or a secret key at a different level of the BGV scheme. Details of this refresh operation can be found in the BGV scheme prior art cited above.

Figure 3:
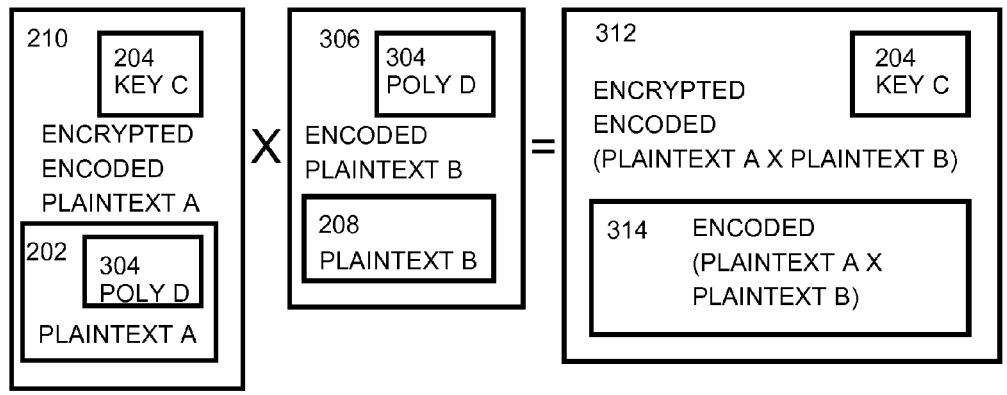
FIG. 3 shows homomorphic multiplication between a ciphertext first encoded using a polynomial and then encrypted using a first key and a plaintext encoded using the same polynomial, the homomorphic multiplication being utilized in embodiments of the present invention.

Referring to FIG. 3, which shows homomorphic multiplication between a ciphertext 210 produced by first encoding a plaintext A 202 using a polynomial D 304 and then encrypting using a first key C 204 and a plaintext B 208 encoded using the same polynomial D 304, the homomorphic multiplication being used in embodiments of the present invention. In embodiments of the invention, plaintext A 202 is the query that the querying party 102 sends to the receiving party 104 and plaintext B 208 is the information that the querying party 102 desires to receive from the receiving party 104. Plaintext A 202 is first encoded using a polynomial D 304 and is then encrypted using key C 204 as shown in FIG. 2 to produce an encrypted, encoded plaintext A 210. Plaintext B 208 is encoded by mapping plaintext B 208 into the same large polynomial ring structure poly D 304 used to construct the encoded plaintext A 210. Using homomorphic multiplication between the encrypted, encoded plaintext A 210 and the encoded plaintext B 306, the result of the homomorphic multiplication is an encrypted, encoded (plaintext A×plaintext B), encrypted with key C 204 and encoded using the same polynomial D 304.

Figure 4:
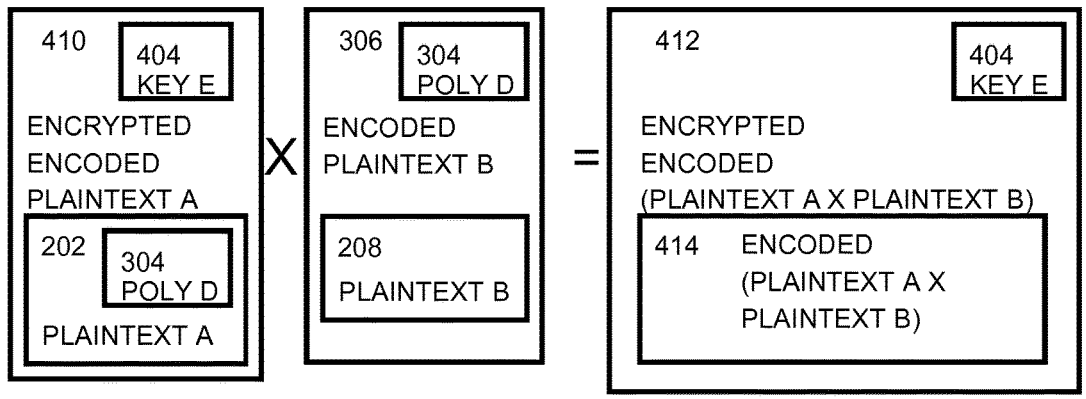
FIG. 4 shows the homomorphic multiplication of FIG. 3 using the same polynomial and a second key in place of the first key, the homomorphic multiplication being utilized in embodiments of the present invention.

Referring to FIG. 4, which shows homomorphic multiplication between a ciphertext 410 produced by first encoding a plaintext A 202 using a polynomial D 304 and then encrypting using a second key E 404 and a plaintext B208 encoded using the same polynomial D 304. The result of the homomorphic multiplication is an encrypted, encoded (plaintext A×plaintext B) 412, encrypted with key E 404 and encoded using the same polynomial D 304. Although a different key 412 from that of FIG. 3 is used for both the encryption and corresponding decryption, the same polynomial D 304 is used for the encoding of plaintext A 202. Although FIG. 4 shows the same plaintext A 202 as FIG. 3, in embodiments of the invention, as this is the query text, this may be the same query text as in FIG. 3, or it may be a different query text. Similarly, plaintext B 202 may be the same information that the querying party 102 desires to receive from the receiving party 104 or it may be different information.

The use of the same polynomial D 304 for the encoding of plaintext B 208 provides the advantage that the same encoded data can be used to respond to queries from parties who use different public keys, such a key C 204 and key E 404 to encrypt their queries 208.

Figure 5:
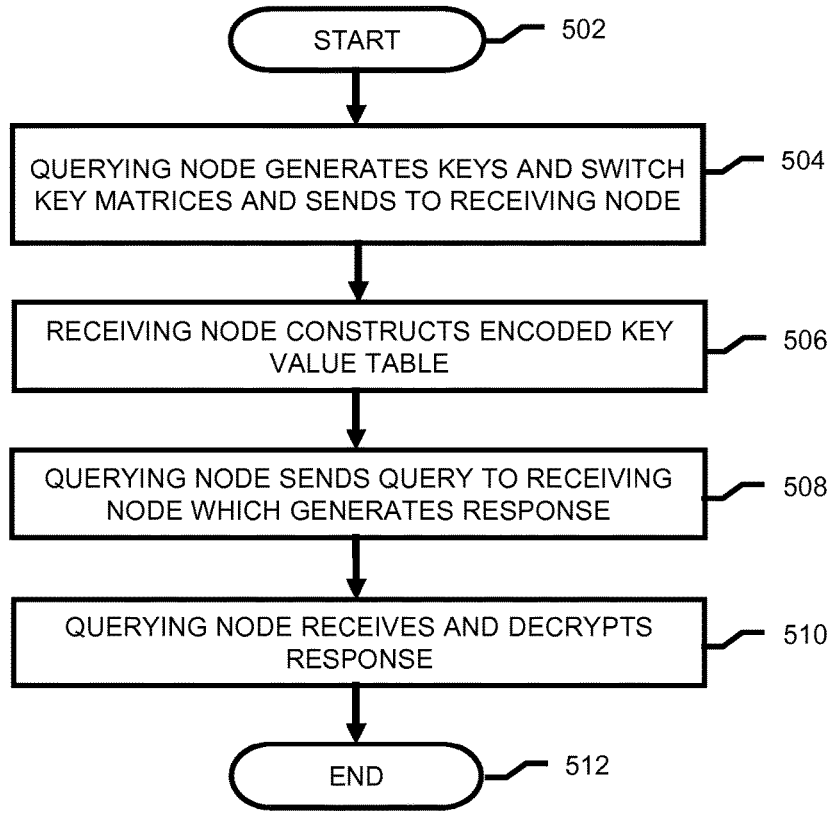
FIG. 5 is a flow chart of embodiments of a method according to the present invention of two party oblivious transfer using fully homomorphic encryption.
Figure 6:
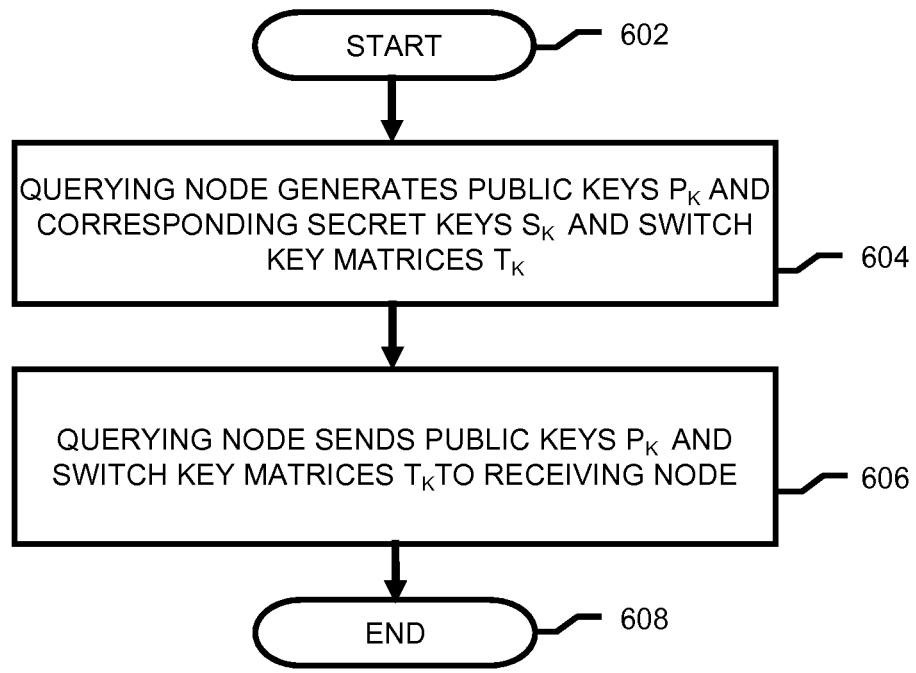
FIG. 6 is a flow chart of step 504 in FIG. 5 of the querying node generating and sending keys to the receiving node.

FIG. 5 is a flow chart of embodiments of a method according to an embodiment of the present invention of two party oblivious transfer. The embodiment is a computer-implemented method for effecting an oblivious query from a querying node to a receiving node based on a fully homomorphic encryption scheme. The method starts at step 502. At step 504, querying node 102 generates public keys, corresponding secret keys and switch key matrices and sends the public keys and switch key matrices to the receiving node 104. Referring to FIG. 6, which is a flow chart of step 504 in FIG. 5 of the querying node generating and sending keys to the receiving node and which starts at step 602. Querying node 102 generates a plurality of public keys $P_k$ and a corresponding plurality of respective secret keys $S_k$. The generated plurality of public keys $P_k$ include a least a highest level public key and the querying node encrypts the query using the highest level public key. The querying node also generates a plurality of switch key matrices $T_k$. At step 606, public key $P_k$ is sent by the querying node 102 to receiving node 104. Further, switch key matrices $T_k$ are also sent by the querying node 102 to receiving node 104. The method of FIG. 3 ends at step 608.

Figure 7:
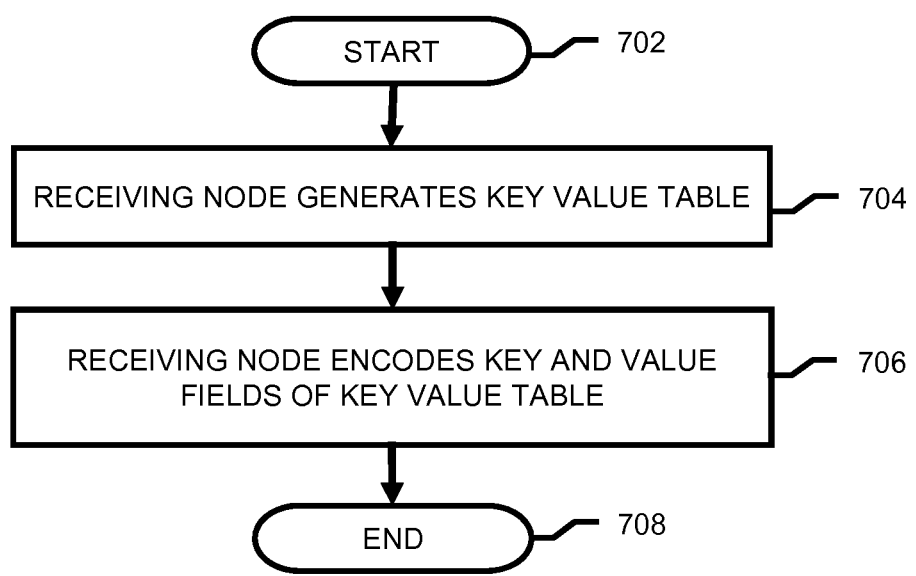
FIG. 7 is a flow chart of step 506 in FIG. 5 of the generation and encoding of a key value table.

Referring back to FIG. 5, at step 506, receiving node 104 constructs an encoded key value table. Referring to FIG. 7, which is a flow chart of step 506 in FIG. 5 of the generation and encoding of a key value table and which starts at step 702. At step 704, receiving node 104 generates a key value table, the key value table mapping values to keys and encoding the keys and values of the key value table into an encoded key-value store using a polynomial ring having coefficients in a predetermined range and of a predetermined degree. The key value table has at least a key and a value and has a plurality of records.

Referring to FIG. 8 which is a first example encoded key value table 802. Key value table 802 comprises keys 804. In the first exemplary table 802, the keys 804 are the names of the subject nodes 106 for which receiving node 104 holds information. Although the first exemplary table 802 shows four names, Ali, Bob, Cat and Dan, embodiments of the present invention are not limited to having four records and are not limited to these particular names. In a second exemplary table, eighteen names may be used as keys, including, for example, Bob Jones, Vanessa Brown, Anitha Bregwig and fifteen others. Also in the exemplary table 802, value 1 806 is a field which contains the address associated with the name in the key field 804. Although the first exemplary table 802 shows four addresses, Address A, Address B, Address C and Address D, embodiments of the present invention are not limited to having four records and are not limited to these particular addresses. Further in the first exemplary table 802, value 2 808 is a field which contains account information associated with the name in key field 804 and value 3 810 is a field which contains balance information for the account of the value 2 808 field.

In a second exemplary table, eighteen addresses may be used as values corresponding to the keys, including for example, 30 High Street, 34 Queens Avenue, 23 Corner Crescent and fifteen others. The pseudo code below shows such a second exemplary table. In the pseudo code below, the TextPoly2 operation is the encoding of the string in quotes, such as '30 High Street', into an element of an Integer Polynomial Ring in Rp.

```
address=vector (FH.R, FH.d)
maxkey = 256
address[0] = FH.TextPoly2('30 High Street')
address[1] = FH.TextPoly2('20 Broad Road')
address[2] = FH.TextPoly2('1 Brick Close')
address[3] = FH.TextPoly2('100 Mill Lane')
address[4] = FH.TextPoly2('10 Spring Crescent')
address[5] = FH.TextPoly2('5 Ward Avenue')
address[6] = FH.TextPoly2('22a Great Street')
address[7] = FH.TextPoly2('1 Straight Mile')
address[8] = FH.TextPoly2('24 Binge Hill')
address[9] = FH.TextPoly2('12b Station Road')
address[10] = FH.TextPoly2('34 Queens Avenue')
address[11] = FH.TextPoly2('43 Hazel Grove')
address[12] = FH.TextPoly2('23 Brick Close')
address[13] = FH.TextPoly2('57 Pond Lane')
address[14] = FH.TextPoly2('423 Long Street')
address[15] = FH.TextPoly2('1 Short Street')
address[16] = FH.TextPoly2('97 Main Road')
address[17] = FH.TextPoly2('23 Corner Crescent')
key = vector(FH.R,FH.d)
key[0] = FH.TextPoly2('Bob Jones')
key[1] = FH.TextPoly2('Fred Fish')
key[2] = FH.TextPoly2('Jim Doger')
key[3] = FH.TextPoly2('Bill Bosh')
key[4] = FH.TextPoly2('Jill Hill')
key[5] = FH.TextPoly2('Brian Beard')
key[6] = FH.TextPoly2('Darren Smith')
key[7] = FH.TextPoly2('John Barker')
key[8] = FH.TextPoly2('Frederick Free')
key[9] = FH.TextPoly2('Julie Blink')
key[10] = FH.TextPoly2('Vanessa Brown')
key[11] = FH.TextPoly2('John Black')
key[12] = FH.TextPoly2('Jack Straw')
key[13] = FH.TextPoly2('Edward Bear')
key[14] = FH.TextPoly2('Bradley Haze')
key[15] = FH.TextPoly2('John Symanzky')
key[16] = FH.TextPoly2('Jillian Brady')
key[17] = FH.TextPoly2('Anitha Bregwig')
```

Referring back to FIG. 7, at step 706, the receiving node 104 encodes the key field 804 and one or more of the value fields 806-810 of the key value table 802. For a value field 806-810 to be used as part of a query 112 from the querying node 102 to the receiving node 104 and the information returned 116 without disclosing the identity of the key field 804 queried, that value field 806-810 needs to be encrypted. However, key value table may optionally contain fields containing information which may not be used as part of a query by the querying node 102, such as, for example, mailing preferences or loyalty card information. Receiving node 104 encodes the key field 804 and one or more of the value fields 806-810 of the key value table 802 using the a polynomial ring structure. The polynomial ring structure is an integer polynomial ring reduced by a chosen cyclotomic polynomial. The encoded form of each key field 804 and value fields 806-810 are shown in FIG. 8 using the form e(key) or e(value). The method of FIG. 7 ends at step 708.

The query, the key field and the value fields are encoded into a polynomial ring $R_p$. A polynomial ring is a polynomial with coefficients in the range 0 to "p" or "-p/2" to "+p/2". The degree of the polynomial can be no larger than the degree "d" of the ciphertext which comprises two polynomials in the ring $R_q$. The degree "d" of these ciphertext polynomials and the maximum value of the parameter "q" is determined by the required security of the scheme. Typically "d" is greater than 10,000.

Querying node 102 and receiving node 104 agree the values of "p" representing the range of coefficients allowed and "d" the degree of the ciphertext. The querying party 102 chooses the value of the parameter "q" depending on the level of security it requires. In an embodiment, the values of "p" and of "d" are determined by the receiving node 104 because it is the receiving node that uses these parameters to encode the ley-value table. Having the same values of "p" and "d" agreed with all querying nodes 102 that may wish to request information means that the key value table only needs to be encoded once with one set of values for "p" and "d".

The receiving node can encode any message of up to length $d \log_2 p$ bits as a polynomial and then put it into the ring $R_p$. In a simple embodiment each value in the key field may be encoded as a polynomial where each coefficient represents, for example, a letter of the alphabet and where the p value is greater than 26. For example, a space is represented by "0", "a" is represented by "1", "b" is represented by "2" and so on until "z" is represented by "26". In practice, a more complex encoding system, such as one that distinguishes between upper and lower case letters and includes numbers is likely to be used. For use with the first exemplary key value table 802 of FIG. 8, the query to be encoded might be "Bob". For use in the second exemplary table, the query might be "Vanessa Brown".

$$bob = 2 + 15x + 2x^2$$

$$vanessa\ brown = 22 + 1x + 14x^2 + 5x^3 + 19x^4 + 19x^5 + 1x^6 + 0x^7 + 2x^8 + 18x^9 + 15x^{10} + 23x^{11} + 14x^{12}$$

A similar encoding may be done for the corresponding 'value field' that is to be returned. In this example, numbers "0" to "9" have been represented by "32" to "41"

$$address\ b = 1 + 4x + 4x^2 + 18x^3 + 5x^4 + 19x^5 + 19x^6 + 0x^7 + 2x^8$$

$$34\ queens\ avenue = 35 + 36x + 0x^2 + 17x^3 + 21x^4 + 5x^5 + 5x^6 + 14x^7 + 19x^8 + 0x^9 + 1x^{10} + 22x^{11} + 5x^{12} + 14x^{13} + 21x^{14} + 5x^{15}$$

The querying party 102 encodes the query in a similar way and puts it into the ring structure $R_p$ and then encrypts it with its public key $P_k$.

In an embodiment, the key and/or value fields may be a concatenation of a name, address, date of birth and the like to give a unique "key value". Similarly it supports the return of a large message of a length up to 'd' alphabetic characters.

In another embodiment, a batching process is used. Since the degree of the polynomial is very large and the "key field" and "value field" values are only a few characters in length then the scheme described above may not be a particularly efficient scheme since only a low degree polynomial is being used. In this embodiment, a batching scheme may be used in which the 'key field' values are packed into slots and have up to "d" slots each of values up to "p". In this embodiment a larger p value may be chosen and the name, such as "bob jones" may be hashed into a number less than p. The batch encoding parameters and the hash scheme to be used has to be agreed by both the querying node 102 and the receiving node 104. A querying party 102 wishing to query for "bob jones" hashes the name and generates a batch encoded polynomial that has the same value in each slot. The querying party 102 then puts it into the ring structure $R_p$ and encrypts it using the public key $P_k$. The receiving node 104 uses the same hash function to generate an encoded polynomial with a different hashed "key value" in each slot. When the comparison operation is performed up to "d" key values can be compared at a time for the same cost as comparing a single value in the simple scheme. This results in an encrypted batch polynomial where only one of the slots has a value of "1" and all the other slots are "0". Multiplying this encrypted polynomial with the batch encoded "value field" produces a ciphertext with "0" in each slot except for the slot that contains the correct answer. If there are more than "d" values to compare, then the operation is simply repeated for the set of values and the results added together. The returned ciphertext when decrypted will have only one slot with a value other than "0" and this will be the required result.

Figure 9:
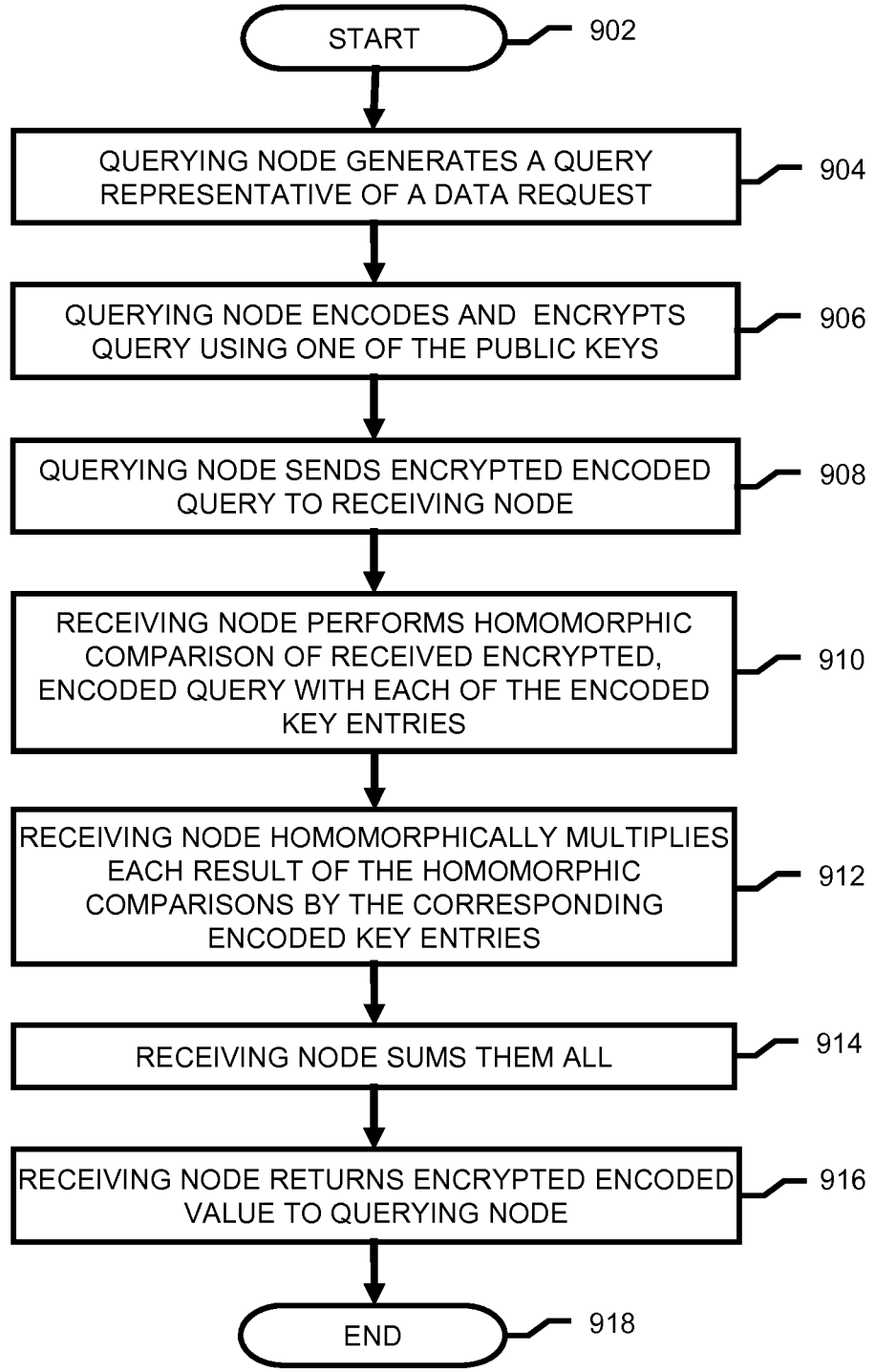
FIG. 9 is a flow chart of step 508 in FIG. 5 of the querying node generating and sending a query and the receiving node generating a response.

Referring back to FIG. 5, at step 508, querying node 102 sends 112 query to receiving node 104 which generates a response 116. Referring to FIG. 9, which is a flow chart of step 508 in FIG. 5 of the querying node generating and sending a query and the receiving node generating a response and which starts at step 902. At step 904, a querying node 102 generates a query representative of a data request, encoding the query using a polynomial ring having coefficients in the said predetermined range and of the said predetermined degree, encrypting the encoded query using one of the generated public keys, and sending the encrypted, encoded query to the receiving node. That is, the polynomial used has coefficients in the same predetermined range and of the same predetermined degree as that used by the receiving node 104 to encode the key value table. For use with the first exemplary key value table 802 of FIG. 8, the query might be "Bob". For use in the second exemplary table, the query might be "Vanessa Brown". For both queries, the information requested might be the address value 1 806 associated with the name key 804. At step 906, the query is first encoded by the querying node 102 by generating a polynomial representation that corresponds with the same encoding as was used by receiving node 104 to encode the key value table 802. The querying node 102 then encrypts the query with its public key $P_k$. This produces a cryptotext encoded in the correct polynomial ring. At step 908, the querying node sends the encrypted, encoded query to the receiving node 104.

The pseudocode below shows the query referred to above for use with the second exemplary table.

```
query = 'Vanessa Brown'
# The query is converted to a ciphertext
maxkey = 256
ct=[ ]
key = mod(hash(query),maxkey)
Skey = Integer(key).digits(base=2,padto=FH.d)
cr = FH.FHE_polyEnc(FH.SlotPoly(Skey),FH.L-1);cr
for j in range(2):
    c=SR(cr[j]).coefficients( )
    for i in range(FH.d):
        ct+=[c[i][0]]
```

Referring to FIG. 10, the encrypted, encoded query 1002 generated by the querying node 102 at step 906 above is shown in the query column 1002. In FIG. 10, encryption is indicated by the symbol "ϵ". The encoded key 804 generated by the receiving node 104 at step 706 above is shown in the key column 804.

Returning to FIG. 9, at step 910, the receiving node 104 performs a homomorphic comparison of the received encrypted, encoded query 1002 with each of the encoded key entries 804 in the encoded key-value store 802 to determine, for each key entry 804 a comparison result 1004. The homomorphic comparison produces a result 1004 of an encryption of "0" (ϵ(0)) if there is no match between the encoded, encrypted query 1002 and the encoded key value 804. The encryption is of "0" encrypted with the public key $P_k$ of the querying node 102, so only the querying node 102 can decrypt it using its secret key $S_k$. Since the key 804 field comprises a list of unique values, there can be at most one matching value. In the first exemplary key value table 802 of FIG. 5, only the key 804 of the second record in the table 802 matches the query and produces a comparison result 1004 of an encryption of "1" (ϵ(1)). The receiving node generates an encryption of "1" by encrypting "1" with the public key $P_k$ of the querying node 102, so only the querying node 102 can decrypt it using its secret key $S_k$. Similarly, the receiving node also generates an encryption of "0" by encrypting "0" with the public key $P_k$ of the querying node 102, so only the querying node 102 can decrypt it using its secret key $S_k$. Thus, the receiving node 104 cannot determine whether any individual one of the comparison results is an encryption of "0" or an encryption of "1". The key 804 for each of the other records in the table do not match the query and so each of these produce a comparison result of an encryption of "0".

At step 912, the receiving node 104 homomorphically multiplies, for each record, the result 1004 of the homomorphic comparison and the address value 1 806. In the first exemplary table, the three instances of a comparison result 1004 of an encryption of "0" when each multiplied by their corresponding address value 1 806 produces a result 1006 of an encryption of "0". The one instance of a comparison result 1004 of an encryption of "1" when multiplied by encoded RECORD B produces a result 1006 of encrypted, encoded RECORD B.

At step 914, the receiving node 104 sums the encrypted, encoded values for each of the value entries and returning the summed encrypted, encoded result to the querying node. In the first exemplary table, the three instances of an encryption of "0" summed with the one instance of encrypted, encoded RECORD B produces a result of encrypted, encoded RECORD B. Again, as stated above with respect to the encryption of "0" and the encryption of "1", the encrypted, encoded record B has been encrypted with the public key $P_k$ of the querying node 102, so only the querying node 102 can decrypt it using its secret key $S_k$. At step 916, the receiving node 104 returns the encrypted, encoded result to the querying node 102. The method of FIG. 9 ends at step 918.

The pseudocode below shows the processing of the query by the receiving node 104 referred to above for use with the second exemplary table.

```
# Receiving node 104 runs the homomorphic operations
from time import time
start = time( )
d=FH.d
level = FH.L-1
c1=[ ]
```

-continued

```
print "Extracting query"
t0 = time( )
nbits = ceil(log(maxkey,2))
c1 = FH.FHE_ExtractBits(cr,nbits,FH.SHML[level],level)
t1 = time( )
print "Time to Extract = ",t1-t0
print "Comparing with key"
comp1= FH.FHE_CompareBits(c1,Tkey,level)
level = level - 3
t2 = time( )
print "Time to Compare = ",t2-t1
print "Extracting Comparisons"
c1=[ ]
c1 = FH.FHE_ExtractBits(comp1,d,FH.SHML[level],level)
t3 = time( )
print "Time to extract comparisons",t3-t2
print "Finding Match"
for i in range (d):
    if i != 0:
        value = value + c1[i]*FH.R(address[i])
    else:
        value = c1[i]*FH.R(address[i])
end = time( )
print "Time to find match",end-t3
print "Time to Extract = ",t1-t0
```

Figure 11:
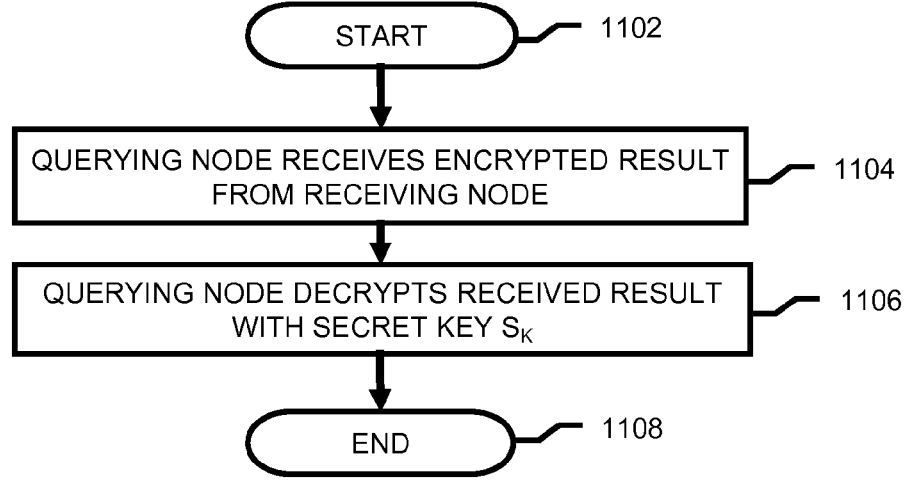
FIG. 11 is a flow chart of step 510 in FIG. 5 of the receiving node receiving and decrypting the response.

Referring back to FIG. 5, at step 510, querying node 102 receives 116 the response from the receiving node 104 and decrypts it. Referring to FIG. 11, which is a flow chart of step 510 in FIG. 5 of the receiving node receiving and decrypting the response and starts at step 1102. At step 1104, the querying node 102 receives the encrypted, encoded result from the receiving node 104. At step 1106, the querying node 102 decrypts the received encrypted, encoded result using the querying node's 102 secret key $S_k$ which corresponds to the querying node's 102 public key $P_k$. The decryption results in an encoded result. The querying node 102 then decodes the encoded value to produce the query result, that is the plaintext information it requested. For use with the first exemplary key value table 802 of FIG. 8, the plaintext information might be "Address B". For use in the second exemplary table, the plaintext information might be "34 Queens Avenue". The method of FIG. 11 ends at step 1108 and returning to FIG. 5, the method of FIG. 5 ends at step 512.

The pseudocode below shows the decryption of the query referred to above for use with the second exemplary table and which produces a result of "Vanessa Brown has an address at 34 Queens Avenue".

```
p6 = FH.FHE_polyDec(value,level)
m6 = FH.PolyText2(p6)
print query,"has and address at",m6
```

Figure 12:
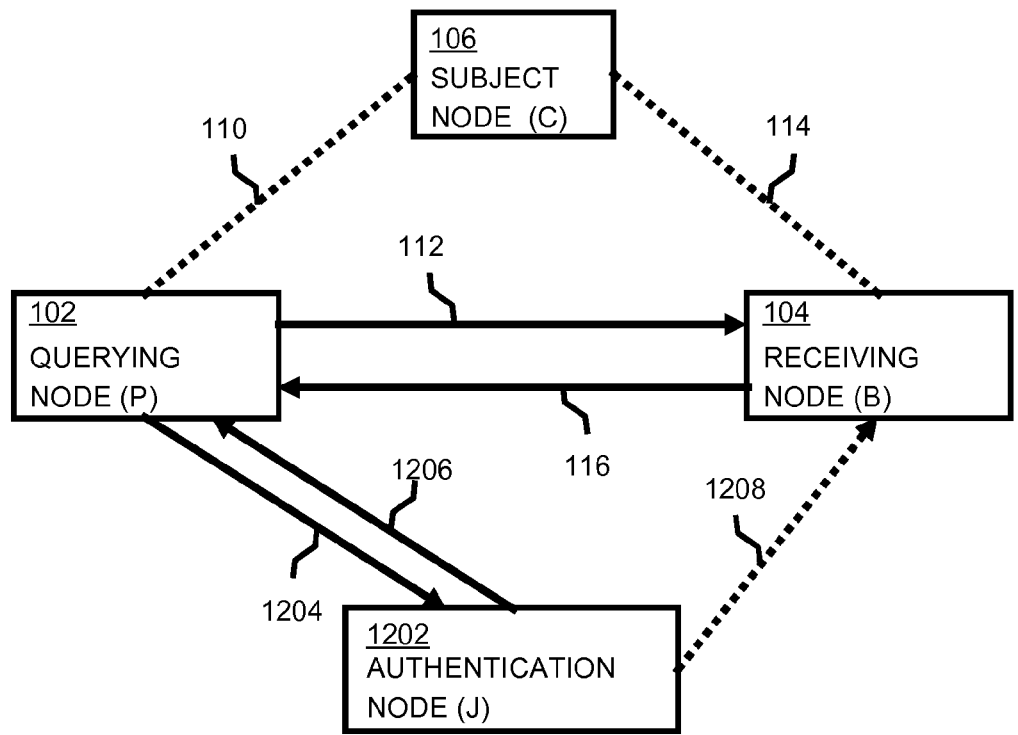
FIG. 12 shows a further embodiment of the present invention further comprising an authentication node.

FIG. 12 shows a further embodiment of the present invention further comprising a trusted third party. A third party authentication node 1202 may be added so as to provide some additional level of assurance for the receiving node 104 that the querying node 102 is a node that is authorized to make requests for the information held by receiving party 104. This is particularly important for the receiving party 104 because the receiving party 104 will have no knowledge of the content of the query submitted by the querying node 102, nor of the result returned by itself to the querying node 102. Receiving node 104 may wish to have some assurance that the querying node 102 has the authority to perform the query. Further receiving node 104 may wish to have an assurance that, at a later date, the receiving node 104 will be provided with knowledge of what information was requested and returned, for example, for audit purposes.

Before the querying node 102 sends a query to receiving node 104, the querying node 102 sends a request 1204 to authentication node 1202. Authentication node 1202 issues a signature which is cryptographically tied to the querying node's 102 public key $P_k$ and is appropriately signed. The receiving node 104 can then be sure that operations performed on the ciphertexts using the querying party's public key $P_k$ can only be decrypted by the querying node 102 using the querying node's secret key $S_k$. At a time later than the time when the receiving node returns the summed encrypted, encoded result to the querying node, the authentication node 1202 may disclose the querying node's 102 secret key $S_k$ corresponding to the public key $P_k$ used to encrypt the query can be released 1208 by the authentication node 1202 to the receiving node 104, who can use the secret key $S_k$ to determine, at the later date, what queries were submitted to it by the querying node 102 and what responses it sent back to the querying node 102.

Figure 13:
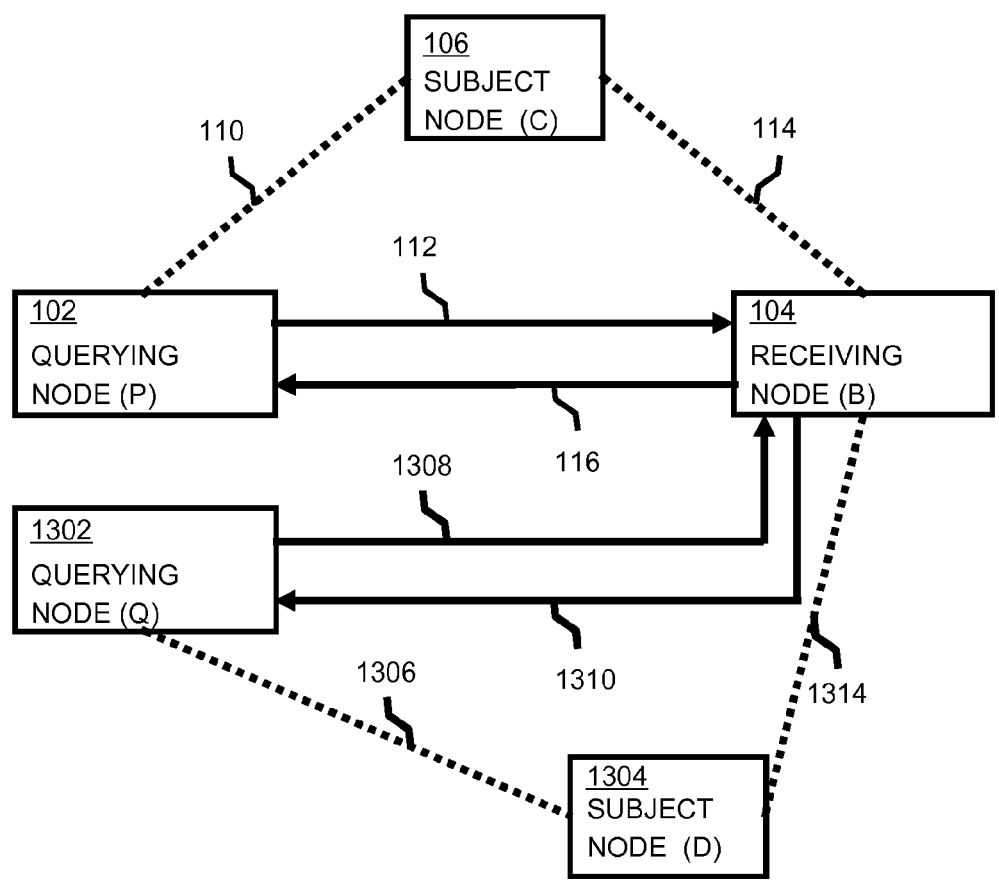
FIG. 13 is a block diagram of the environment of FIG. 1 in which embodiments of the present invention of two party oblivious transfer may be implemented and which comprises two separate querying nodes.

FIG. 13 shows an embodiment which includes a plurality of querying modes 102, 1302. In the example of FIG. 13, two separate querying nodes 102, 1302 are shown, but any number of querying nodes 102, 1302 may be used. Each querying node 102, 1302 generates respective public keys, corresponding secret keys, and switch key matrices and sends the generated respective public keys and the switch key matrices to the receiving node. One or more of the plurality of querying nodes 102, 1302 generates a query representative of a data request, encodes the query using said fully homomorphic encryption scheme, encrypts the encoded query using one of the generated public keys $P_k$, and sends 112, 1308 the encrypted, encoded query to the receiving node 104. Each one of the plurality of querying nodes uses a different public key $P_k$ and secret key $S_k$ pair. The one or more of the plurality of querying nodes 102, 1302 decrypts the received encrypted, encoded result using the corresponding secret key $S_k$ and decodes the encoded value to produce a query result.

Queries from both querying nodes 102, 1302 are encoded using an encoding scheme common to both of the querying nodes 102, 1302 and to the receiving node 104. The key value table 802 at the receiving node 104 is encoded using this common encoding scheme. However, the use of a different public key $P_k$ and secret key $S_k$ pair for each querying node 102, 1302 means that only the querying node 102, 1302 submitting the query can decrypt the results. Neither the receiving node 104, nor the querying node 102, 1302 which did not submit the query can decrypt the results. The receiving node 104 only needs to have a single encoded key value table 502 which it can use with both of the querying nodes 102, 1302. The receiving node 104 may optionally store the different public keys $P_k$ for each of the querying nodes 102, 1302 in a key store.

Figure 14:
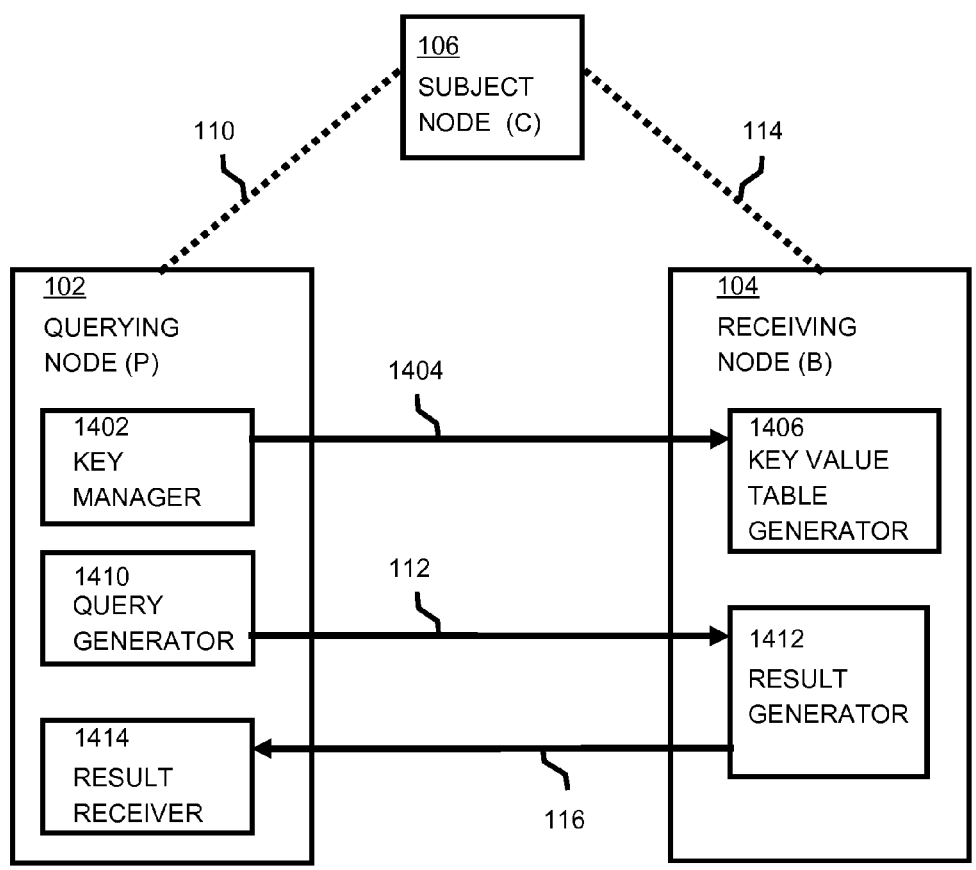
FIG. 14 is a block diagram of an embodiment of a system according to the present invention of two party oblivious transfer using fully homomorphic encryption.

Referring now to FIG. 14, which is a block diagram of an embodiment of a system according to the present invention of two party oblivious transfer using fully homomorphic encryption. FIG. 14 shows a system for effecting an oblivious query from a querying node 102 to a receiving node 104 based on a fully homomorphic encryption scheme. Key manager 1402, which is associated with the querying node 102, generates public keys $P_k$, corresponding secret keys $S_k$, and switch key matrices and sends 1404 the public keys $P_k$ and the switch key matrices to the receiving node.

Key value table generator 1406, is associated with a receiving node 104, which generates a key value table 502, the key value table 502 mapping values 806-810 to keys 804 and encoding the keys 804 and values 806-810 of the key value table 802 into an encoded key-value store using a polynomial ring having coefficients in a predetermined range and of a predetermined degree.

Query generator 1410, associated with the querying node 102, generates a query representative of a data request, encodes the query using coefficients in the said predetermined range and of the said predetermined degree, encrypts the encoded query using one of the generated public keys $P_k$, and sends 112 the encrypted, encoded query to the receiving node 104.

Result generator 1412, associated with the receiving node 104, performs a homomorphic comparison of the encrypted, encoded query 1002 with each of the encoded key entries 804 in the encoded key-value store to determine, for each key entry, a comparison result 1004 and which sums the encrypted, encoded values 1006 for each of the value entries and returns 116 the summed encrypted, encoded result to the querying node 102.

Result receiver 1414, associated with the querying node 102, decrypts the received encrypted, encoded result using the corresponding secret key $_{Sk}$ and decodes the encoded value to produce a query result.

Figure 15:
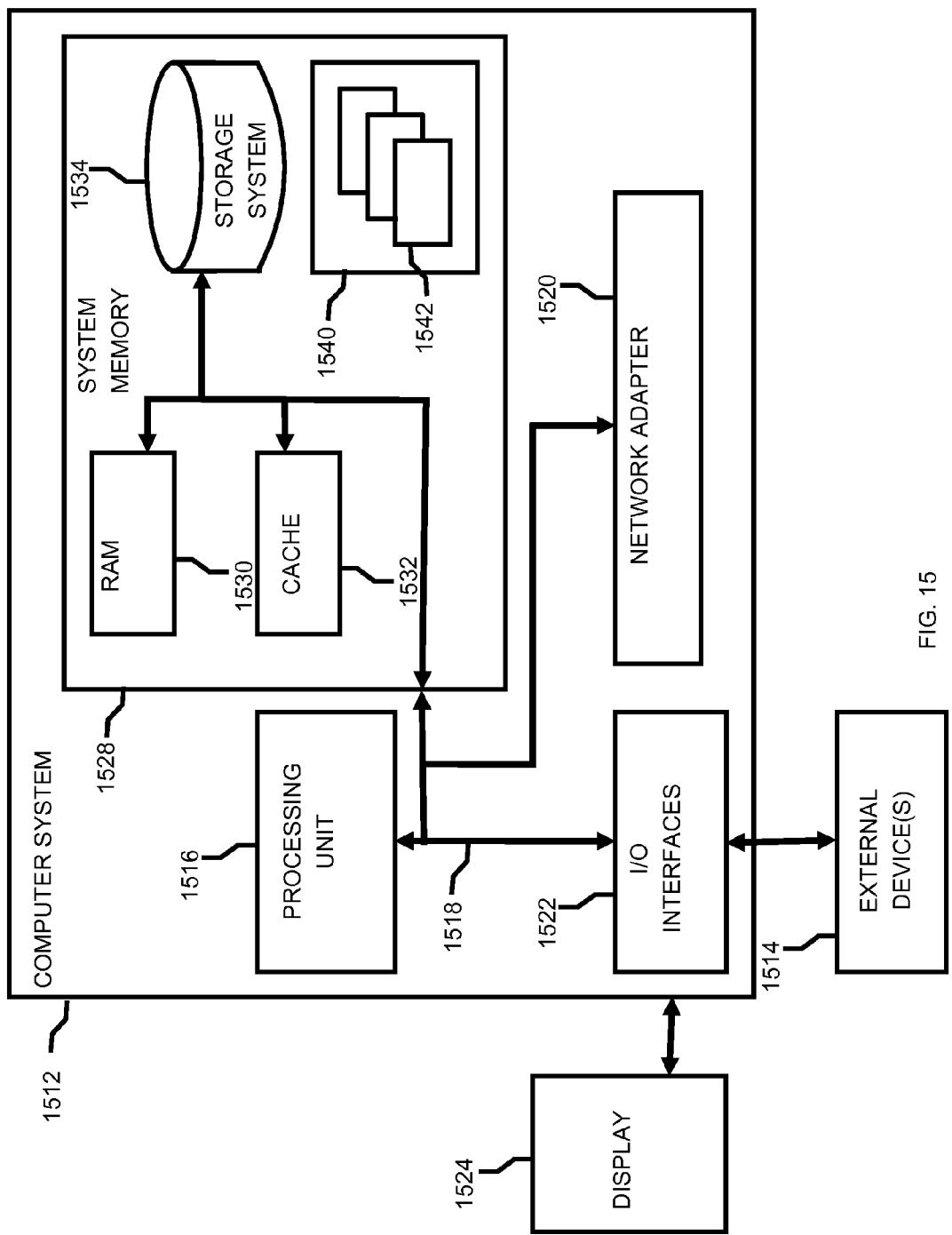
FIG. 15 depicts a computer system according to an embodiment of the present invention.

Referring now to FIG. 15, a schematic of an example of computing system is shown. Computing system 1512 is only one example of a suitable computing system and is not intended to suggest any limitation as to the scope of use or functionality of embodiments of the invention described herein. Regardless, computing system 1512 is capable of being implemented and/or performing any of the functionality set forth hereinabove.

Computer system/server 1512 is operational with numerous other general purpose or special purpose computing system environments or configurations. Examples of well-known computing systems, environments, and/or configurations that may be suitable for use with computer system/server 1512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 1512 is shown in the form of a general-purpose computing device. The components of computer system/server 1512 may include, but are not limited to, one or more processors or processing units 1516, a system memory 1528, and a bus 1518 that couples various system components including system memory 1528 to processor 1516.

Bus 1518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1512 typically includes a variety of computer system readable media. Such media may be any available media that is accessible by computer system/server 1512, and it includes both volatile and non-volatile media, removable and non-removable media.

System memory 1528 can include computer system readable media in the form of volatile memory, such as random access memory (RAM) 1530 and/or cache memory 1532. Computer system/server 1512 may further include other removable/non-removable, volatile/non-volatile computer system storage media. By way of example only, storage system 1534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1518 by one or more data media interfaces. As will be further depicted and described below, memory 1528 may include at least one program product having a set (e.g., at least one) of program modules that are configured to carry out the functions of embodiments of the invention.

Program/utility 1540, having a set (at least one) of program modules 1542, may be stored in memory 1528 by way of example, and not limitation, as well as an operating system, one or more application programs, other program modules, and program data. Each of the operating system, one or more application programs, other program modules, and program data or some combination thereof, may include an implementation of a networking environment. Program modules 1542 generally carry out the functions and/or methodologies of embodiments of the invention as described herein.

Computer system/server 1512 may also communicate with one or more external devices 1514 such as a keyboard, a pointing device, a display 1524, etc.; one or more devices that enable a user to interact with computer system/server 1512; and/or any devices (e.g., network card, modem, etc.) that enable computer system/server 1512 to communicate with one or more other computing devices. Such communication can occur via Input/Output (I/O) interfaces 1522. Still yet, computer system/server 1512 can communicate with one or more networks such as a local area network (LAN), a general wide area network (WAN), and/or a public network (e.g., the Internet) via network adapter 1520. As depicted, network adapter 1520 communicates with the other components of computer system/server 1512 via bus 1518. It should be understood that although not shown, other hardware and/or software components could be used in conjunction with computer system/server 1512. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for effecting an oblivious query from a querying node to a receiving node based on a leveled fully homomorphic encryption scheme, the computer implemented method comprising:
a querying node generating a plurality of public keys, a corresponding plurality of secret keys and a plurality of switch key matrices, each public key being associated with a level of the fully homomorphic encryption scheme, the switch key matrices being used to switch ciphertexts from a first level of the fully homomorphic encryption scheme to a next lower level of the fully homomorphic encryption scheme;
the querying node sending at least a public key associated with said first level of the fully homomorphic encryption scheme and said plurality of switch key matrices to a receiving node;
the receiving node generating a key value table, the key value table mapping values to keys and encoding the keys and values of the key value table into an encoded key-value store using an element of an integer polynomial ring having coefficients in a predetermined range and of a predetermined degree;
the querying node generating a query representative of a data request, encoding the query using an element of an integer polynomial ring having coefficients in the predetermined range and of the predetermined degree, encrypting the encoded query using one of the generated public keys, and sending the encrypted, encoded query to the receiving node;
the receiving node performing a homomorphic comparison of the encrypted, encoded query with each of the encoded key entries in the encoded key-value store to determine, for each key entry, a comparison result;
the receiving node summing the encrypted, encoded values for each of the value entries and returning the summed encrypted, encoded result to the querying node; and
the querying node decrypting the received encrypted, encoded result using the corresponding secret key and decoding the encoded value to produce a query result.

2. The computer-implemented method of claim 1, wherein a plurality of querying nodes:
generate respective public keys, corresponding secret keys, and switch key matrices;
send at least the generated respective public key associated with said higher level of the fully homomorphic encryption scheme and said plurality of switch key matrices to the receiving node; and
wherein one or more of the plurality of querying nodes:
generates a query representative of a data request, encoding the query using said fully homomorphic encryption scheme, encrypting the encoded query using one of the generated public keys, and sending the encrypted, encoded query to the receiving node; and
decrypts the received encrypted, encoded value using the corresponding secret key and decoding the encoded value to produce a query result.

3. The computer-implemented method of claim 1, wherein:
the generated public keys comprise a plurality of public keys, including a least a highest level public key; and
the querying node encrypts the query using the highest level public key.

4. The computer-implemented method of claim 1, further comprising:
providing an authentication node;
the authentication node issuing a signature, the signature being cryptographically tied to the querying node's public key and being appropriately signed.

5. The computer-implemented method of claim 4, wherein said authentication node discloses the secret key associated with the querying node's public key to said receiving node at a time later than the time when the receiving node returns the summed encrypted, encoded result to the querying node.

6. A system for effecting an oblivious query from a querying node to a receiving node based on a leveled fully homomorphic encryption scheme, the system comprising:
a querying node, the querying node being a first computer system comprising a first memory and a first processor in communication with the first memory; and
a receiving node, the receiving node being a second computer system comprising a second processor in communication with a second memory, wherein the system is configured to perform a method comprising:
generating by the querying node, a plurality of public keys, a corresponding plurality of secret keys and a plurality of switch key matrices, each public key being associated with a level of the fully homomorphic encryption scheme, the switch key matrices being used to switch ciphertexts from a first level of the fully homomorphic encryption scheme to a next lower level of the fully homomorphic encryption scheme;
sending, by the querying node, at least a public key associated with said first level of the fully homomorphic encryption scheme and said plurality of switch key matrices to the receiving node;
generating, by the receiving node, a key value table, the key value table mapping values to keys and encoding the keys and values of the key value table into an encoded key-value store using an element of an integer polynomial ring having coefficients in a predetermined range and of a predetermined degree;
generating, by the querying node, a query representative of a data request, encoding the query using an element of an integer polynomial ring having coefficients in the predetermined range and of the predetermined degree, encrypting the encoded query using one of the generated public keys, and sending the encrypted, encoded query to the receiving node;
performing, by the receiving node, a homomorphic comparison of the encrypted, encoded query with each of the encoded key entries in the encoded key-value store to determine, for each key entry, a comparison result;
summing, by the receiving node, the encrypted, encoded values for each of the value entries and returning the summed encrypted, encoded result to the querying node; and
decrypting, by the querying node, the received encrypted, encoded result using the corresponding secret key and decoding the encoded value to produce a query result.

7. The system of claim 6, wherein:
a plurality of querying nodes generate respective public keys, corresponding secret keys, and switch key matrices and send at least the generated respective public key associated with said higher level of the fully homomorphic encryption scheme and said plurality of switch key matrices to the receiving node; and wherein one or more of the plurality of querying nodes generates a query representative of a data request, encodes the query using said fully homomorphic encryption scheme, encrypts the encoded query using one of the generated public keys, and sends the encrypted, encoded query to the receiving node; and wherein one or more of the plurality of querying nodes decrypts the received encrypted, encoded value using the corresponding secret key and decodes the encoded value to produce a query result.

8. The system of claim 6, wherein:

the generated public keys comprise a plurality of public keys, including a least a highest level public key; and the querying node encrypts the query using the highest level public key.

9. The system of claim 6, further comprising:

an authentication node, which issues a signature, the signature being cryptographically tied to the querying node's public key and being appropriately signed.

10. The system of claim 9, wherein said authentication node discloses the secret key associated with querying node's public key to said receiving node at a time later than the time when the receiving node returns the summed encrypted, encoded result to the querying node.

11. A computer program product for effecting an oblivious query from a querying node to a receiving node based on a leveled fully homomorphic encryption scheme, the computer program product comprising:

a computer readable storage medium having program instructions embodied therewith, the program instructions executable by a computer to cause the computer to:

generate, at a querying node, a plurality of public keys, a corresponding plurality of secret keys and a plurality of switch key matrices, each public key being associated with a level of the fully homomorphic encryption scheme, the switch key matrices being used to switch ciphertexts from a first level of the fully homomorphic encryption scheme to a next lower level of the fully homomorphic encryption scheme;

send, from the querying node, at least a public key associated with said first level of the fully homomorphic encryption scheme and said plurality of switch key matrices to a receiving node;

generate, at the receiving node, a key value table, the key value table mapping values to keys and encoding the keys and values of the key value table into an encoded key-value store using an element of an integer polynomial ring having coefficients in a predetermined range and of a predetermined degree;

generate, at the querying node, a query representative of a data request, encoding the query using an element of an integer polynomial ring having coefficients in the predetermined range and of the predetermined degree, encrypting the encoded query using one of the generated public keys, and sending the encrypted, encoded query to the receiving node;

perform, at the receiving node, a homomorphic comparison of the encrypted, encoded query with each of the encoded key entries in the encoded key-value store to determine, for each key entry, a comparison result;

sum, at the receiving node, the encrypted, encoded values for each of the value entries and returning the summed encrypted, encoded result to the querying node; and decrypt, at the querying node, the received encrypted, encoded result using the corresponding secret key and decoding the encoded value to produce a query result.

12. The computer program product of claim 11, wherein a plurality of querying nodes:

generate respective public keys, corresponding secret keys, and switch key matrices;

send at least the generated respective public key associated with said higher level of the fully homomorphic encryption scheme and said plurality of switch key matrices to the receiving node; and wherein one or more of the plurality of querying nodes:

generates a query representative of a data request, encoding the query using said fully homomorphic encryption scheme, encrypting the encoded query using one of the generated public keys, and sending the encrypted, encoded query to the receiving node; and decrypts the received encrypted, encoded value using the corresponding secret key and decoding the encoded value to produce a query result.

13. The computer program product of claim 11, wherein:

the generated public keys comprise a plurality of public keys, including a least a highest level public key; and the querying node encrypts the query using the highest level public key.

14. The computer program product of claim 11, wherein the program instructions are executable by the computer to further cause the computer to:

provide an authentication node;

the authentication node issuing a signature, the signature being cryptographically tied to the querying node's public key and being appropriately signed.

15. The computer program product of claim 14, wherein said authentication node discloses the secret key associated with the querying node's public key to said receiving node at a time later than the time when the receiving node returns the summed encrypted, encoded result to the querying node.

* * * * *